United States Patent
Sekizawa et al.

(10) Patent No.: US 8,815,470 B2
(45) Date of Patent: Aug. 26, 2014

(54) FUEL CELL CATALYST, MEMBRANE ELECTRODE ASSEMBLY AND SOLID POLYMER ELECTROLYTE FUEL CELL

(75) Inventors: Koshi Sekizawa, Susono (JP); Haruyuki Nakanishi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1097 days.

(21) Appl. No.: 11/884,787

(22) PCT Filed: Feb. 24, 2006

(86) PCT No.: PCT/JP2006/304030
§ 371 (c)(1),
(2), (4) Date: Sep. 18, 2007

(87) PCT Pub. No.: WO2006/090907
PCT Pub. Date: Aug. 31, 2006

(65) Prior Publication Data
US 2008/0160375 A1    Jul. 3, 2008

(30) Foreign Application Priority Data
Feb. 24, 2005    (JP) ................... 2005-049645

(51) Int. Cl.
*H01M 4/90* (2006.01)
*H01M 4/92* (2006.01)
*H01M 4/02* (2006.01)
*H01M 8/10* (2006.01)

(52) U.S. Cl.
CPC .......... *H01M 4/90* (2013.01); *H01M 2004/028* (2013.01); *H01M 4/9075* (2013.01); *H01M 4/92* (2013.01); *Y02E 60/50* (2013.01); *H01M 2008/1095* (2013.01)
USPC .......................................... 429/524; 429/528

(58) Field of Classification Search
CPC .. H04M 4/9025; H04M 4/9033; H04M 4/923
USPC ......................................... 429/489, 524, 528
See application file for complete search history.

(56) References Cited

U.S. PATENT DOCUMENTS 5,670,270 A * 9/1997 Wallin .......................... 429/482
6,372,686 B1    4/2002 Golden
(Continued)

FOREIGN PATENT DOCUMENTS

EP    1 441 406 A2    7/2004
JP    A-02-169033    6/1990
(Continued)

OTHER PUBLICATIONS

Kong et al., "Gas-sensing property and mechanism of $Ca_xLa_{1-x}FeO_3$ ceramics," *Sensors and Actuators B*, vol. 30, 1996, pp. 217-221.
(Continued)

*Primary Examiner* — Milton I Cano
*Assistant Examiner* — Stephen Yanchuk
(74) *Attorney, Agent, or Firm* — Oliff PLC

(57) ABSTRACT

It is a main object of the present invention to provide a fuel cell catalyst in which a support for supporting a metal catalyst has electrical conductivity in itself and which can prevent agglomeration of the metal catalyst during long term use of the fuel cell. In the present invention, the object is achieved by providing a fuel cell catalyst for use in a cathode-side catalyst electrode layer of a solid polymer electrolyte fuel cell, comprising a metal catalyst and a perovskite-type complex oxide ($ABO_3$).

8 Claims, 1 Drawing Sheet

(56) References Cited

U.S. PATENT DOCUMENTS

| | | |
|---|---|---|
| 2001/0053467 A1 | 12/2001 | Kaneko et al. |
| 2002/0164507 A1* | 11/2002 | Ding et al. ............ 429/21 |
| 2003/0054227 A1 | 3/2003 | Hiroshima et al. |
| 2004/0137310 A1* | 7/2004 | Kiros ............ 429/42 |
| 2004/0142229 A1 | 7/2004 | Herman et al. |
| 2006/0177725 A1* | 8/2006 | Seabaugh et al. ......... 429/40 |
| 2006/0260955 A1 | 11/2006 | Sasaki et al. |
| 2008/0008912 A1 | 1/2008 | Herman et al. |
| 2009/0200519 A1 | 8/2009 | Sawaki et al. |

FOREIGN PATENT DOCUMENTS

| | | |
|---|---|---|
| JP | A-04-298240 | 10/1992 |
| JP | A-10-093029 | 4/1998 |
| JP | A-2001-224963 | 8/2001 |
| JP | A-2002-246033 | 8/2002 |
| JP | A-2002-246034 | 8/2002 |
| JP | A-2002-346387 | 12/2002 |
| JP | A-2002-352806 | 12/2002 |
| JP | A-2003-092114 | 3/2003 |
| JP | A-2003-217598 | 7/2003 |
| JP | A-2003-288905 | 10/2003 |
| JP | A-2004-095263 | 3/2004 |
| JP | A-2004-209468 | 7/2004 |
| JP | A-2005-050759 | 2/2005 |
| JP | A-2005-190833 | 7/2005 |
| JP | A-2006-062953 | 3/2006 |
| JP | A-2008-004286 | 1/2008 |
| WO | WO 98/15961 A1 | 4/1998 |
| WO | WO 02/13302 A1 | 2/2002 |
| WO | WO 02/075827 A1 | 9/2002 |

OTHER PUBLICATIONS

Krupicka et al., "Morphology of nanoscaled $LaMO_3$ -particles (M=Mn, Fe, Co, Ni) derived by citrate precursors in aqueous and alcoholic solvents," *Crystal Engineering*, 2002, pp. 195-202, vol. 5, Elsevier Science Ltd.

Dec. 5, 2013 Office Action issued in U.S. Appl. No. 12/088,064.

Yue et al.; "Preparation of nanocrystalline composite oxide $SrRuO_3$ and its application in the fuel cell as negative electrode materials"; Materials Chemistry and Physics 57 (1999) 285-288.

* cited by examiner

FUEL CELL CATALYST, MEMBRANE ELECTRODE ASSEMBLY AND SOLID POLYMER ELECTROLYTE FUEL CELL

TECHNICAL FIELD

The present invention relates to a fuel cell catalyst capable of preventing agglomeration of a metal catalyst and to a membrane electrode assembly and a solid polymer electrolyte fuel cell each using such a fuel cell catalyst.

BACKGROUND ART

A unit cell as a minimum electric generation unit for a solid polymer electrolyte fuel cell (hereinafter also simply referred to as "fuel cell") generally includes: a membrane electrode assembly including a solid electrolyte membrane and catalyst electrode layers (an anode-side catalyst electrode layer and a cathode-side catalyst electrode layer) bonded to both sides of the solid electrolyte membrane; a gas diffusion layer placed on both sides of the membrane electrode assembly; and a separator placed outside the gas diffusion layer.

Such a catalyst used in the catalyst electrode layer of a fuel cell generally includes a carbon support (having an electrically-conductive function) and a metal catalyst such as Pt supported on the surface of the carbon support. Patent Document 1 also discloses that a metal catalyst such as Pt is supported on the surface of a support mainly composed of $SiO_2$.

In Patent Document 1, however, the $SiO_2$ itself does not have electrical conductivity so that the electrochemical reaction may be delayed in Pt and thus the electric generation efficiency may be reduced.

When carbon or $SiO_2$ is used for a support, there is also a problem in that the interaction between the support and the metal catalyst such as Pt performing the catalytic function is weak so that, during long term use of the fuel cell, agglomeration of the metal catalyst is occurred to reduce the surface area of the metal catalyst, and thus the electric generation efficiency may be reduced.

Patent Document 1: Japanese Patent Application Laid-Open (JP-A) No. 2002-246033
Patent Document 2: JP-A No. 2004-95263
Patent Document 3: JP-A No. 2002-246034

The present invention has been made in view of the above problems, and it is a main object of the present invention to provide a fuel cell catalyst in which a support for supporting a metal catalyst has electrical conductivity in itself and which can prevent agglomeration of the metal catalyst during long term use of the fuel cell.

DISCLOSURE OF INVENTION

In order to achieve the object, the present invention provides a fuel cell catalyst for use in a cathode-side catalyst electrode layer of a solid polymer electrolyte fuel cell, comprising a metal catalyst having a catalytic activity and a perovskite-type complex oxide ($ABO_3$).

According to the present invention, the fuel cell catalyst includes the perovskite-type complex oxide ($ABO_3$) that can exhibit a strong interaction with the metal catalyst to suppress agglomeration of the metal catalyst. Further, the perovskite-type complex oxide itself has electrical conductivity so that it can efficiently transfer electrons and thus facilitate the electrochemical reaction.

In the above invention, it is preferable that the perovskite-type complex oxide ($ABO_3$) has a lattice defect portion at a B site, and a metal ion of the metal catalyst is located at the lattice defect portion. This is because when the metal ion of the metal catalyst is incorporated into the lattice defect portion of the perovskite-type complex oxide, the metal ion can be fixed so that agglomeration of the metal catalyst can be suppressed during long term use of a fuel cell.

In the above invention, it is preferable that the metal catalyst is platinum. This is because platinum can perform an excellent catalytic function on oxygen gas.

In the present invention there is also provided a membrane electrode assembly where a solid electrolyte membrane is sandwiched between an anode-side catalyst electrode layer and a cathode-side catalyst electrode layer, wherein the cathode-side catalyst electrode layer contains the above fuel cell catalyst. In the present invention there is also provided a solid polymer electrolyte fuel cell comprising the above membrane electrode assembly.

According to the present invention, the cathode-side catalyst electrode layer contains the above fuel cell catalyst. By using the fuel cell catalyst for manufacturing the membrane electrode assembly or the solid polymer electrolyte fuel cell, agglomeration of the metal catalyst can be suppressed during long term use of the fuel cell, so that a reduction in electric generation efficiency can be suppressed.

In the present invention there is also provided a fuel cell-equipped automobile comprising the above membrane electrode assembly, wherein an oxidative atmosphere and a reductive atmosphere are repeated in the cathode-side catalyst electrode layer.

EFFECTS OF THE INVENTION

The fuel cell catalyst of the present invention has the advantages that the perovskite-type complex oxide to support the metal catalyst has electrical conductivity in itself so that it can efficiently transfer electrons and that the interaction between the metal catalyst and the perovskite-type complex oxide is strong so that agglomeration of the metal catalyst can be prevented during long term use of the fuel cell.

BEST MODE FOR CARRYING OUT THE INVENTION

The fuel cell catalyst, the membrane electrode assembly and the solid polymer electrolyte fuel cell of the present invention will be explained respectively.

A. Fuel Cell Catalyst

Firstly, the fuel cell catalyst of the present invention will be explained. The fuel cell catalyst of the present invention is for use in a cathode-side catalyst electrode layer of a solid polymer electrolyte fuel cell, and comprises a metal catalyst having a catalytic activity and a perovskite-type complex oxide ($ABO_3$).

The fuel cell catalyst of the present invention is not particularly limited as long as it includes the metal catalyst and the perovskite-type complex oxide ($ABO_3$) as described later. An example thereof includes one where the metal catalyst is supported on the perovskite-type complex oxide. In particular, the whole or part of the metal catalyst is preferably incorporated in a structure of the perovskite-type complex oxide. Specifically, it is preferable that the perovskite-type complex oxide ($ABO_3$) having a lattice defect portion at B site and that a metal ion of the metal catalyst is located at the lattice defect portion. This is because when the metal ion of the metal catalyst is incorporated into the lattice defect portion of the perovskite-type complex oxide, it can be fixed so that agglomeration of the metal catalyst can be suppressed during long term use of the fuel cell. In addition, the perovskite-type complex oxide itself has electrical conductivity and thus allows an efficient transfer of electrons so that it can facilitate the electrochemical reaction.

Each component of the fuel cell catalyst of the present invention will be explained.

(1) Perovskite-Type Complex Oxide

Figure 1:
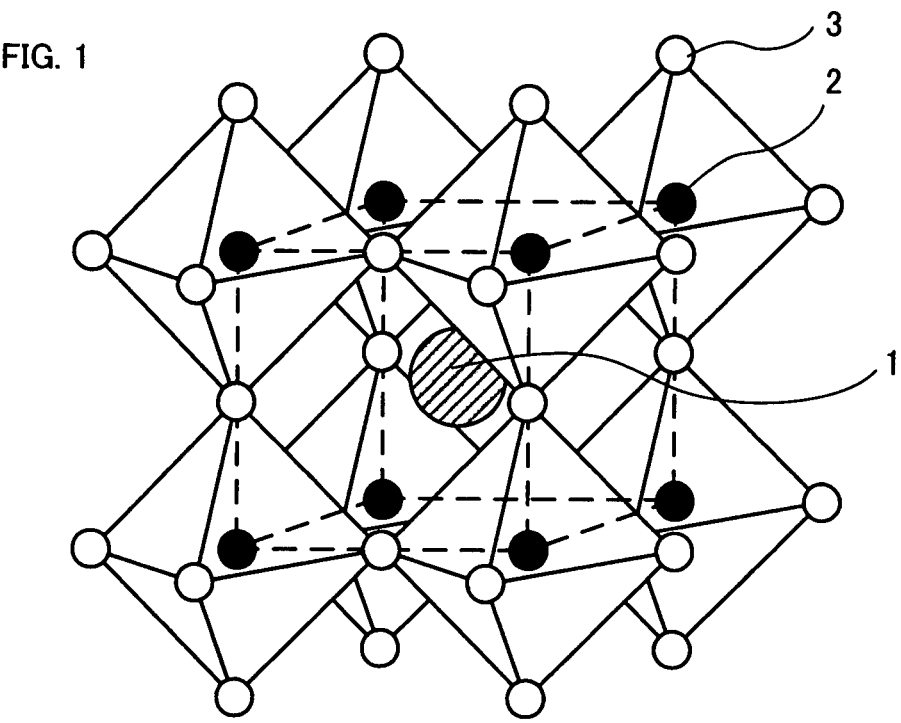
FIG. 1 is a schematic diagram showing the crystal structure of a perovskite-type complex oxide.
Figure 2:
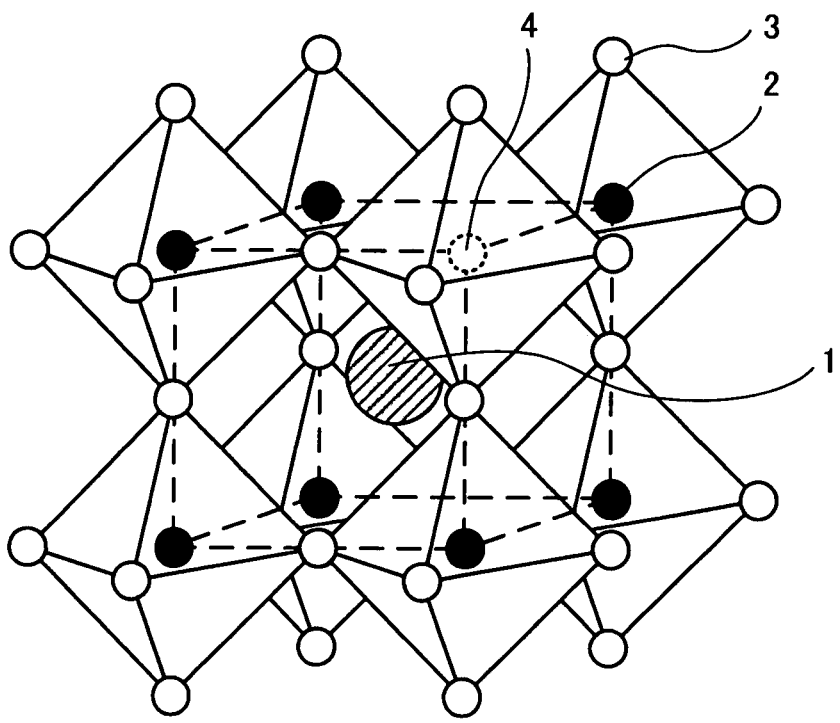
FIG. 2 is a schematic diagram showing the crystal structure of a perovskite-type complex oxide having a lattice defect portion.
In the attached drawings, reference numeral 1 represents an A ion, 2 a B ion, 3 an oxygen ion, and 4 a lattice defect portion.

Firstly, the perovskite-type complex oxide for use in the present invention will be explained. The perovskite-type complex oxide has the composition of $ABO_3$ (wherein A and B are different metal ions) and has a crystal structure as shown in FIG. 1, an A ion 1 is located at the center of the cube composed of eight B ions 2, and each B ion 2 is located at the center of the octahedron composed of six oxygen ions 3, and the octahedrons sharing an apex with one another are three-dimensionally linked along the x, y and z axes. In general, the A ion is a metal ion with a relatively large ionic radius, while the B ion is a metal ion with a relatively small ionic radius. In the present invention, the position of the A ion in the crystal structure of the perovskite-type complex oxide is called "A site," and the position of the B ion is called "B site." In the present invention, the perovskite-type complex oxide preferably has a lattice defect portion at a B site. As shown in FIG. 2, for example, such a perovskite-type complex oxide has a lattice defect portion 4 at a B site.

The average particle size of the perovskite-type complex oxide for use in the present invention is generally in the range of 20 nm to 2 μm, preferably in the range of 20 nm to 1 μm, more preferably in the range of 20 nm to 300 nm. When the average particle size is in the above range, a catalyst electrode layer with a good holes structure can be obtained by using a mixture of the fuel cell catalyst of the present invention and Nafion (trade name, manufactured by Du Pont) or the like described later.

The perovskite-type complex oxide preferably has the lattice defect portions at 0 to 30%, more preferably 1 to 10%, still more preferably 3 to 5% of all B sites. When the lattice defect portions exist in the above range, the perovskite structure can be sufficiently preserved so that migration causing an increase of Pt particle size due to the effect of heat can be suppressed, The metal element constituting the perovskite-type complex oxide for use in the present invention is not particularly limited as long as it is able to constitute the perovskite-type complex oxide. Examples of such metal elements include rare earth elements such as La, Ce and Y, alkaline earth elements such as Ba, Ca and Sr, and first-row transition metal elements such as Co, Mn, Ni, Ti, and Fe. In particular, La, Ba, Sr, Co, and Ni are preferred, and La, Sr and Co are more preferred.

The perovskite-type complex oxide comprising the above metal element is not particularly as long as it containing the above metal element. Examples of such a perovskite-type complex oxide include $LaCo_xO_3$ ($0.95 \leq x \leq 0.97$) and $La_{1-y}Sr_yCo_xO_3$ ($0.95 \leq x \leq 0.97$, $0.2 \leq y \leq 0.4$). In particular, $LaCo_xO_3$ ($0.95 \leq x \leq 0.97$) is preferred in view of electrical conductivity.

The production method of the perovskite-type complex oxide for use in the present invention is not particularly limited as long as it can produce the perovskite-type complex oxide. An example thereof includes a method for dissolving a metal salt (an A ion source) containing a metal element for producing A ions and another metal salt (a B ion source) containing another metal element for producing B ions in a solvent such as water, adding a compound having a chelating effect such as citric acid to the aqueous solution, then evaporating the solution by heating to dryness, and finally firing the residue.

In the above method, the amount of the addition of the B ion source may be smaller than that of the A ion source so that a perovskite-type complex oxide having a lattice defect portion can be obtained. For example, when both metal salts are added in a molar ratio of A ion to B ion of 100:97, a perovskite-type complex oxide having lattice defects at 3% of the B sites can be obtained.

(2) Metal Catalyst

Next, the metal catalyst for use in the present invention will be explained. The metal catalyst for use in the present invention has a catalytic activity on oxygen gas.

The average particle size of the metal catalyst for use in the present invention is preferably in the range of 1 to 10 nm, more preferably in the range of 1 to 5 nm, still more preferably in the range of 2 to 5 nm. It is technically difficult to produce a metal catalyst with an average particle size of less than the above range. The metal catalyst with an average particle size of more than the above range tends more to agglomerate.

The content of the metal catalyst in the fuel cell catalyst of the present invention is not particularly limited as long as it exhibits a catalytic function. It is preferable in the range of 10 to 60 wt %, more preferable in the range of 10 to 40 wt %, still more preferable in the range of 20 to 40 wt %. When the content is less than the above range, good electric generation performance may fail to be achieved, while the content is more than the above range, it may be not preferable in view of cost.

The metal catalyst for use in the present invention may be a simple metal or may be an alloy, a simple metal is preferred because the present invention uses the metal catalyst in combination with the perovskite-type complex oxide.

Any material used as a metal catalyst for general fuel cells may be used in the present invention. Examples of such a material include Pt, Pd, Ru, Ir, and Os. Among them, Pt and Pd are preferred, and Pt is more preferably used.

Specifically, the metal catalyst for use in the present invention is most preferably a simple platinum metal. This is because it has an excellent catalytic activity on oxygen gas and can be placed as a Pt ion at the lattice defect site of the perovskite-type complex oxide.

The production method of the fuel cell catalyst of the present invention is not particularly limited. An example thereof includes a method for suspending the perovskite-type complex oxide and a precursor of the metal catalyst in water, adding an oxidizing agent thereto to form an oxide of the metal catalyst on the perovskite-type complex oxide, and then adding a reducing agent thereto. For example, in the case where the metal catalyst is platinum, the precursor may be, but not limited to, platinic chloride ($H_2PtCl_6$), dinitrodiamino platinum, platinic chloride, platinous chloride, bis(acetylacetonato)platinum, dichlorodiamine platinum, or dichlorotetramine platinum. For example, the oxidizing agent may be $H_2O_2$, and the reducing agent may be $NaBH_4$.

(3) Fuel Cell Catalyst

The cathode-side catalyst electrode layer described later preferably contains 10 to 90 wt %, more preferably 30 to 70 wt %, still more preferably 40 to 60 wt % of the fuel cell catalyst of the present invention.

The fuel cell catalyst of the present invention is used for a cathode-side catalyst electrode layer of a solid polymer electrolyte fuel cell. Herein, explained is the behavior of the metal catalyst in a case where a solid polymer electrolyte fuel cell using the fuel cell catalyst of the present invention unsteadily generates electricity. When a solid polymer electrolyte fuel cell unsteadily generates electricity, for example, in a case where the solid polymer electrolyte fuel cell is used in an automobile, an oxidative atmosphere and a reductive atmosphere are repeated in the cathode-side catalyst electrode layer containing the fuel cell catalyst of the present invention. Specifically, for example, when Pt is used as a metal catalyst, the cathode-side catalyst electrode layer is deficient in electrons at a voltage between 0.76 V and 1.23 V and thus can be easily oxidized to form Pt ions. On the other hand, at a voltage between 0 V and 0.76 V, the cathode-side catalyst electrode layer is rich in electrons and thus can be easily reduced to form $Pt^0$.

Under the reductive conditions, the metal ions of the metal catalyst incorporated in the lattice defect portion of the fuel cell catalyst are deposited on the perovskite-type complex oxide. On the other hand, under the oxidative conditions, the deposited metal catalyst is turned into metal ions and incorporated again into the lattice defect portion of the fuel cell catalyst. In the present invention, such a repetition of the dissolution and deposition of the metal catalyst allows suppression of the grain growth of the metal catalyst and thus allows suppression of agglomeration of the metal catalyst.

B. Membrane Electrode Assembly

Next, the membrane electrode assembly of the present invention will be explained.

The membrane electrode assembly of the present invention includes a solid electrolyte membrane sandwiched between an anode-side catalyst electrode layer and a cathode-side catalyst electrode layer, and the cathode-side catalyst electrode layer includes the fuel cell catalyst described above. According to the present invention, the cathode-side catalyst electrode layer contains the above fuel cell catalyst. By using the fuel cell catalyst for manufacturing the membrane electrode assembly or the solid polymer electrolyte fuel cell, agglomeration of the metal catalyst can be suppressed during long term use of the fuel cell, so that a reduction in electric generation efficiency can be suppressed.

(1) Cathode-Side Catalyst Electrode Layer

The cathode-side catalyst electrode layer for use in the present invention includes at least a fuel cell catalyst and an electrolyte material. The fuel cell catalyst is described above in the section "A. Fuel Cell Catalyst", and therefore, a description is not provided here.

The electrolyte material for use in the present invention mainly contributes to proton conduction. Any electrolyte material used for catalyst electrode layers of general fuel cells may be used as such an electrolyte material. Examples of such an electrolyte material include fluororesins such as perfluorosulfonic acid polymers, typified by Nafion (trade name, manufactured by Du Pont) and hydrocarbon resins such as polyimide having a proton-conducting group such as a sulfo, carboxyl, phosphite, phosphonic acid, or hydroxyl group.

The cathode-side catalyst electrode layer may contain an additional electrically-conductive material. Although the fuel cell catalyst itself has electrical conductivity, the additional electrically-conductive material can further increase the electrical conductivity. Any electrically-conductive material used for catalyst electrode layers of general fuel cells may be used as such an electrically-conductive material, and specifically carbon black may be used as the electrically-conductive material.

(2) Anode-Side Catalyst Electrode Layer

The anode-side catalyst electrode layer for use in the present invention includes at least a catalyst, an electrolyte material and an electrically-conductive material. Any catalyst and any electrically-conductive material used for catalyst electrode layers of general fuel cells may be used for the anode-side catalyst electrode layer. An example thereof includes one where Pt serving as a metal catalyst is supported on carbon black serving as an electrically-conductive material. The electrolyte material is the same as that for use in the cathode-side catalyst electrode layer, and therefore, a description is not provided here.

(3) Solid Electrolyte Membrane

The solid electrolyte membrane for use in the present invention may be any solid electrolyte membrane used for general fuel cells. The material for use in such a solid electrolyte membrane may be the same as the electrolyte material for use in the cathode-side catalyst electrode layer, and therefore, a description is provided here.

C. Solid Polymer Electrolyte Fuel Cell

Next, the solid polymer electrolyte fuel cell of the present invention will be explained. The solid polymer electrolyte fuel cell of the present invention comprises the membrane electrode assembly described above. According the present invention, the cathode-side catalyst electrode layer of the membrane electrode assembly contains the fuel cell catalyst described above so that agglomeration of the metal catalyst can be suppressed during long term use of the fuel cell.

The solid polymer electrolyte fuel cell of the present invention includes a membrane electrode assembly, a gas diffusion layer placed on both sides of the membrane electrode assembly, and a separator placed outside the gas diffusion layer. The membrane electrode assembly is the same as described above in the section "B. Membrane Electrode Assembly," and therefore, a description is not provided here. The gas diffusion layer may be of any type used for general fuel cells, and examples thereof include molded carbon fiber products and the like. Examples of the separator include, but are not limited to, carbon type separators and metal type separators.

The present invention is not limited to the embodiments. The above-mentioned embodiments are examples, and any one having the substantially same configuration as the technological concept mentioned in the claims of the present invention and providing the same effects can be included in the technological scope of the present invention.

EXAMPLES

The present invention is more specifically described by showing the examples below.

Example

In 1 liter of water were dissolved and diffused 30 g of $La(NO_3)_3.6H_2O$ and 19.6 g of $Co(NO_3)_2.6H_2O$. Citric acid in a molar amount three times the molar amount of the nitrate was added to the aqueous solution and stirred. The aqueous solution was then evaporated to dryness, and the residue was finally fired to give a powder. The resulting powder was baked at a temperature of 600 to 800° C. to give a $LaCo_{0.97}O_{3-x}$ powder. The product was measured using an X-ray diffractometer and determined to have the composition stated above.

Then, 10 g of the $LaCo_{0.97}O_{3-x}$ powder and 0.4 g of $H_2PtCl_6$ were dissolved and diffused in 1 liter of water. $H_2O_2$ was then added dropwise thereto for reduction. Filtration and then drying were performed so that $Pt/LaCo_{0.97}O_{3-x}$ was obtained. The $Pt/LaCo_{0.97}O_{3-x}$, a carbon powder and Nafion (manufactured by Du Pont) were then mixed to form a paste. A cathode-side catalyst electrode layer was obtained using the resulting paste.

The resulting cathode-side catalyst electrode layer, a Pt/C catalyst-containing anode-side catalyst electrode layer for general fuel cells, and a solid electrolyte membrane of Nafion 117 (manufactured by Du Pont) were used to form a membrane electrode assembly (MEA). Gas diffusion layers and a separator each for general fuel cells were placed on the MEA so that a solid polymer type fuel cell was obtained.

In a comparative example, a solid polymer type fuel cell was obtained using the above process except that the Pt/C catalyst was used for the cathode-side catalyst electrode layer in place of the fuel cell catalyst of the present invention.

The resulting solid polymer type fuel cells were each subjected to cyclic voltammogram measurement so that the Pt surface area was calculated. The conditions for the measurement were as follows:

Measurement Conditions
Cell temperature: 80° C.
Anode gas: hydrogen (80° C., RH=100%)
Cathode gas: oxygen (80° C., RH=100%)
Measurement process: Current was continuously allowed to flow while the voltage increased from 0 V to about 0.2 V, and this process was repeated.
Measurement time: after 100 hours and after 500 hours.

The results obtained under the conditions are shown in Table 1.

TABLE 1

| | Pt Surface Area Reduction Rate | | |
|---|---|---|---|
| | Catalyst | After 100 Hours | After 500 Hours |
| Example | Pt/LaCo$_{0.97}$O$_{3-x}$ Catalyst | 3% | 4% |
| Comparative Example | Pt/C Catalyst | 4% | 8% |

It is apparent from Table 1 that as a result, the Pt surface area reduction rate was smaller in the case where the Pt/LaCo$_{0.97}$O$_{3-x}$ catalyst was used than in the case where the Pt/C catalyst was used. In other words, it has been found that agglomeration of the metal catalyst can be suppressed during long term use of the fuel cell.

The invention claimed is:

1. A fuel cell catalyst for use in a cathode-side catalyst electrode layer of a solid polymer electrolyte fuel cell, comprising a metal catalyst having a catalytic activity and a perovskite-type complex oxide (ABO$_3$), wherein:
   the perovskite-type complex oxide (ABO3) has a lattice defect portion at 1% to 30% of all B sites,
   a metal ion of the metal catalyst is located at the lattice defect portion, and the metal ion located at the lattice defect portion is capable of being deposited on the perovskite-type complex oxide under reductive conditions, and being incorporated again into the lattice defect portion under oxidative conditions.

2. The fuel cell catalyst according to claim 1, wherein the metal catalyst is platinum.

3. A membrane electrode assembly where a solid electrolyte membrane is sandwiched between an anode-side catalyst electrode layer and a cathode-side catalyst electrode layer,
   wherein the cathode-side catalyst electrode layer contains the fuel cell catalyst of claim 1.

4. A solid polymer electrolyte fuel cell comprising the membrane electrode assembly of claim 3.

5. A fuel cell-equipped automobile comprising the membrane electrode assembly of claim 3, wherein an oxidative atmosphere and a reductive atmosphere are repeated in the cathode-side catalyst electrode layer.

6. A membrane electrode assembly where a solid electrolyte membrane is sandwiched between an anode-side catalyst electrode layer and a cathode-side catalyst electrode layer,
   wherein the cathode-side catalyst electrode layer contains the fuel cell catalyst of claim 2.

7. A solid polymer electrolyte fuel cell comprising the membrane electrode assembly of claim 6.

8. A fuel cell-equipped automobile comprising the membrane electrode assembly of claim 6, wherein an oxidative atmosphere and a reductive atmosphere are repeated in the cathode-side catalyst electrode layer.

* * * * *